C. F. STRONG.
ELECTRIC GENERATING SYSTEM.
APPLICATION FILED MAR. 31, 1920.
1,387,742.
Patented Aug. 16, 1921.
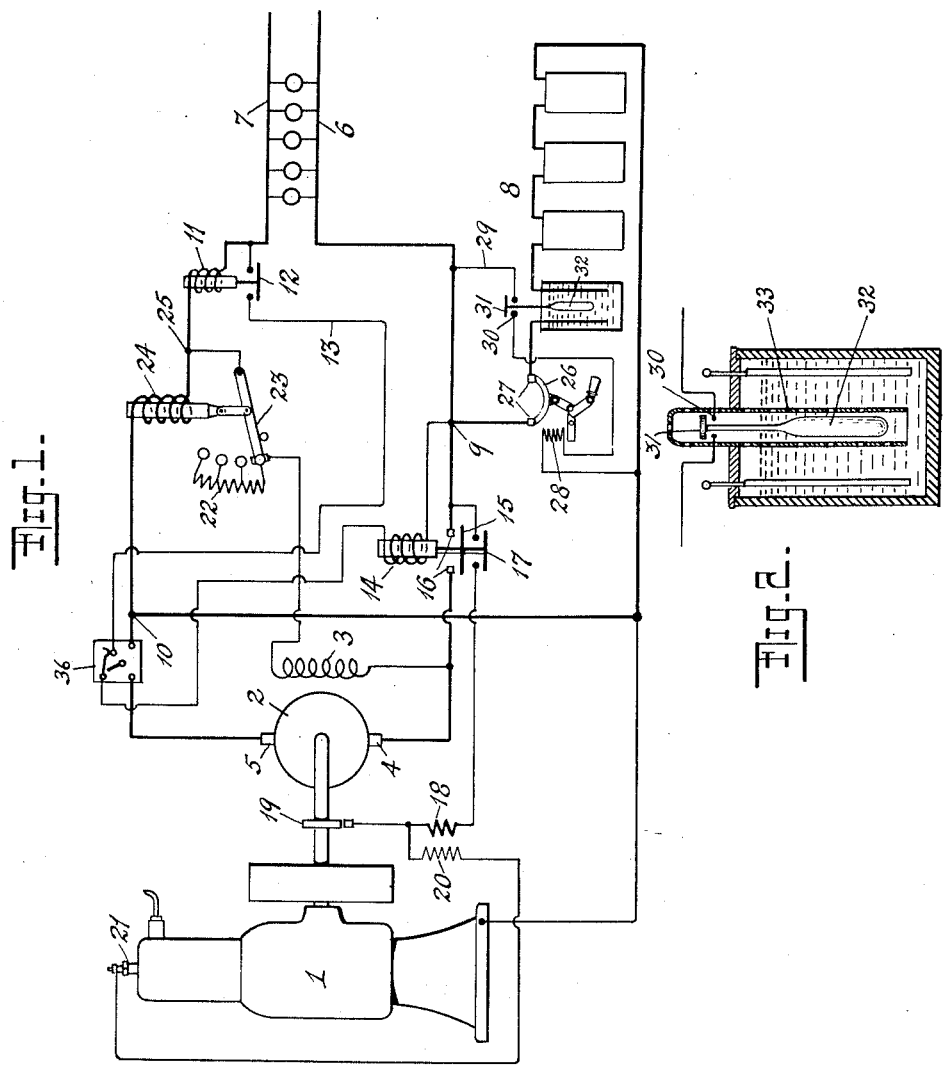
INVENTOR
C. F. STRONG
BY
ATTORNEYS

UNITED STATES PATENT OFFICE.

CHESTER F. STRONG, OF NEW YORK, N. Y.

ELECTRIC GENERATING SYSTEM.

1,387,742.   Specification of Letters Patent.   Patented Aug. 16, 1921.

Application filed March 31, 1920. Serial No. 370,065.

*To all whom it may concern:*

Be it known that I, CHESTER F. STRONG, a citizen of the United States, residing at city, county, and State of New York, have invented a certain new and useful Improvement in Electric Generating Systems, of which the following is a full, clear, and exact description.

My invention relates to generating and distributing systems, and has for its object to provide a system in which the speed of a prime mover is varied so as to maintain the voltage on the line substantially equal to that of a secondary battery connected therewith, the control of the prime mover being through the action of the field of the generator.

It further has for its object the bettering the fuel economy of the engine by permitting it to operate at low speeds when the line load is light and at increased speeds as the load on the line becomes heavier, thus, running the engine at its full torque capacity for varying loads.

A further object of my invention is to provide a system having the characteristics stated, which shall be self-starting, and also in which the overdischarge of the batteries will be prevented.

A further object is to provide a means which will protect the battery from being charged at an excessive rate.

The following is a description of an embodiment of my invention, reference being had to the accompanying drawing which shows the same diagrammatically.

I attain these objects by the mechanism illustrated in the accompanying drawing, in which:—

Figure 1 shows the system of circuits; and Fig. 2 is a detail of the hydrometer.

Referring more particularly to the drawings 1 is a suitable prime mover, which in this case is shown as an internal combustion engine of the electrical ignition type receiving on each stroke an energy charge of fuel so as to have a nearly uniform torque at any charge for each speed over a considerable range. 2 is the armature of a generator driven thereby and having a field winding 3 and brushes 4 and 5, which are adapted to be connected respectively to the mains 6 and 7 supplying the translating devices. 8 is a storage battery, one terminal of which is normally connected to the main 7 and brush 5 at the point 10. In series with the main 7 is a solenoid 11 actuating a switch-arm 12, which controls contacts in series with a branch circuit 13 and a solenoid 14. The solenoid 14 controls a switch-arm 15, which opens and closes contacts 16 in the circuit between the brush 4 and the point 9. The solenoid 14 also actuates a switch-arm 17 controlling the contacts in the primary of an ignition coil 18 leading to the timer 19. The secondary 20 of the ignition coil is connected to the spark plug 21 of the engine.

In carrying out my invention, I control the engine speed by varying the magnetic field of the generator, making the field-control and output of the generator and engine a function of the load. This is possible, since the output of the generator is directly related to the speed of the engine and the strength of the generator field. In my present embodiment herein described, I vary the field strength by varying the resistance in the shunt field winding, that being one way of getting the desired result.

In order to vary the resistance of the field winding circuit, the resistances 22 are provided which are cut in and out of circuit by pivoted arm 23, actuated by a solenoid 24 in series with the main 7 and brush 5, the arm 23 being connected to the main 7 at the point 25. The solenoid 24 acts only when the load is relatively large. 26 is a shunt trip circuit-breaker automatically opening and manually closing contacts 27 to disconnect and connect the storage battery 8 from the point 9, same being actuated by the coil 28 to open the same, this coil 28 being in series with a shunt circuit 29 containing contacts 30. These contacts 30 are normally open and are closed by a switch-arm 31, which is carried by the upper end of a hydrometer float 32 surrounded by a shield 33 in one of the cells of the storage battery. The specific gravity of the cell decreases as the battery is discharged, with the result that when the battery is discharged beyond a pre-determined point, the hydrometer descends so as to close the contacts 30 and energize the coil 28 causing the circuit-breaker 26 to open so as to disconnect the battery. The operation of the system is as follows:

Under normal circumstances, the circuit-breaker 26 is closed. When that is the case and there is no load on the mains, the switch-arm 12 is open, and the switch-arm 23 is in its lowermost position, cutting out all of the resistances 22 from the field circuit of the generator. If a translating device is put in circuit, current is supplied thereto from the battery 8 passing through the solenoids 24 and 11. If the current is small, it has no actuating effect upon the solenoid 24, but causes the solenoid 11 to close the switch 12, which energizes the solenoid 14, so as to close the switches 15 and 17, whereupon current from the battery flows through the generator causing the same to act as a motor to revolve the engine so as to start it.

As soon as the engine is revolved and starts firing, it assumes the speed determined by the torque developed by the generator due to the field 3, which field, at the start, is primarily supplied by storage battery. As the load is increased the solenoid 24 becomes energized sufficiently so as to move the arm 23 in opposition to the usual spring or its equivalent in such a manner as to cut in one or more of the resistances 22, with the result that the magnetization of the field of the generator is reduced, permitting the engine to speed up, due to the fact that the full torque of the generator is not developed until that speed is reached, which is in accordance with the magnetization of the shunt field 3.

When the load still further increases, more resistance 22 is introduced into the field circuit, which in turn permits the engine to run at a still higher speed, and accordingly develop more power.

In a reciprocating engine in which the cylinder receives a full energy charge on each stroke, the torque is a practically constant quantity at any speed and in order that the speed may be increased, the counter torque must be reduced; furthermore, the power capacity of such an engine increases with the increase of speed.

Furthermore it is characteristic of a shunt or the usual compound generator that the torque of the generator for a certain field excitation is sufficient with the devices shown to limit the engine to a speed which is in accordance with this excitation.

Therefore, by the automatic cutting down of the field through the increase in the load, the speed of the motor is increased so that its power is sufficient to supply the load, the voltage being maintained substantially equal to that of the battery.

The motor and generator and solenoid switch 24 and resistance 22 are so related that whenever the generator is running, the battery will be charging slightly, up to the point where the engine is carrying its full capacity at its highest speed, so that the battery is automatically re-charged by the operation of the system and kept in condition thereby.

If for any reason, the engine should fail to act and the battery becomes discharged to too great an extent, switch-arm 31 will fall, so as to cause the automatic circuit-breaker 26 to open and disconnect the battery. This is a very abnormal condition, and means that something serious is the trouble. After such trouble is remedied the switch 26 is closed, by hand. 36 is a reverse current time limit relay of any standard type which acts to open the circuit through the solenoid 14 in case the engine fails to start after a predetermined time. This will disconnect the generator from the battery until the circuit through the solenoid 14 is manually restored.

The storage battery in multiple with the generating unit and the load in applicant's system performs a very peculiar function. It not only maintains the voltage upon the system substantially constant but acts in such manner as to absorb the excess energy generated due to the inertia of the engine and generator parts when the generating unit is slowing down upon a decrease of load, and, conversely, delivers current to the generator so as to aid in accelerating the moving parts as the load increases.

As will be evident to those skilled in the art, my invention permits of various modifications without departing from the spirit thereof or the scope of the appended claims.

What I claim is:

1. In a generating and distributing system, the combination of a generator having a shunt winding, a prime mover therefor having a nearly uniform torque at any charge for each speed over a considerable range, said prime mover being rigidly connected to the generator, a resistance adapted to be placed in series with the field winding of the generator, a load circuit, a storage battery in multiple with said load circuit, and a solenoid in series with the load and not with said battery, said solenoid being adapted to cut in one or more sections of said resistance as the load increases.

2. In an electric generating and distributing system, the combination of a load circuit comprising mains and translating devices thereon, an electrical generator having a shunt field winding, a prime mover therefor and rigidly connected thereto, a storage battery in parallel with the translating devices on the mains, means controlled by the load for placing said battery in parallel with the generator, means controlled by the load for increasing the resistance of the field winding of the generator and correspondingly increasing the speed of the prime mover as the load increases, said first means being responsive to a small load and said second means being responsive to a load beyond the torque capacity of the engine on its first speed, said prime mover being an internal combustion engine of the electrical ignition type, an ignition circuit having means to close the same by the action of said first means.

3. In an electric generating and distributing system, the combination of a load circuit comprising mains and translating devices thereon, an electrical generator having a shunt field winding, a prime mover therefor and rigidly connected thereto, a storage battery in parallel with the translating devices on the mains, means controlled by the load for placing said battery in parallel with the generator, means controlled by the load for increasing the resistance of the field winding of the generator and correspondingly increasing the speed of the prime mover as the load increases, said first means being responsive to a small load and said second means being responsive to a load beyond the torque capacity of the engine on its first speed, said prime mover being an internal combustion engine of the electrical ignition type, an ignition circuit having means to close the same by the action of said first means, and a reverse current time limit relay in series with said battery and acting to interrupt the circuit passing through said battery and generator after a predetermined time.

4. In an electric generating and distributing system, the combination of a load circuit comprising mains and translating devices therefor, an electrical generator having a shunt field winding, a prime mover therefor, a storage battery in parallel with the translating devices on the mains, a relay in series with said translating devices, a circuit closing switch controlled by said first relay and acting when energized to place said battery in multiple with said generator, a reverse current time limit relay in series with said storage battery and generator and acting to interrupt the circuit through said switch after a predetermined time, a solenoid in series with said battery and translating devices, and a resistance in series with said shunt winding cut into circuit as the current on the mains increases.

5. In an electrical generating and distributing system, the combination of a load circuit comprising mains and translating devices thereon, a generator having a shunt winding, a prime mover therefor rigidly connected to said generator, the speed of said prime mover automatically changing with its load, said prime mover having nearly uniform torque on any charge for each speed over a considerable range, and means for reducing the effective field of the generator as the load on the load circuit increases, and vice versa, and means in multiple with said load circuit and generator unit for absorbing excess energy upon lowering engine speeds and delivering energy for the acceleration upon rising engine speeds.

6. In an electrical generating and distributing system, the combination of a load circuit comprising mains and translating devices thereon, an electric generator, an internal combustion engine having a nearly uniform torque at speeds within its operating range, a storage battery in parallel with said load circuit and with said generator when the generator is operating, and means responsive to the load on said load circuit and controlling the excitation of the generator field and thereby causing the speed and energy output of the engine and generator to vary with the load on said load circuit.

CHESTER F. STRONG.